(12) United States Patent
Lee

(10) Patent No.: US 7,618,737 B2
(45) Date of Patent: Nov. 17, 2009

(54) LITHIUM SECONDARY BATTERY AND METHOD FOR MANUFACTURING THE SAME

(75) Inventor: Jin Uk Lee, Youngin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 755 days.

(21) Appl. No.: 11/234,833

(22) Filed: Sep. 23, 2005

(65) Prior Publication Data

US 2006/0093902 A1 May 4, 2006

(30) Foreign Application Priority Data

Sep. 24, 2004 (KR) .................. 10-2004-0077232

(51) Int. Cl.
*H01M 2/02* (2006.01)
*H01M 2/14* (2006.01)
(52) U.S. Cl. ............................ 429/66; 429/94; 429/130; 29/623.1
(58) Field of Classification Search .................. 429/66, 429/94, 130, 181; 29/623.1
See application file for complete search history.

(56) References Cited

U.S. PATENT DOCUMENTS 5,972,534 A * 10/1999 Pasquier .................. 429/66 X
6,509,115 B2 * 1/2003 Kim et al. ................ 429/181 X

FOREIGN PATENT DOCUMENTS

| JP | 10-241744 | 9/1998 |
| JP | 10-247503 | 9/1998 |
| JP | 2001-185224 | 7/2001 |
| KR | 2001-0005018 | 1/2001 |
| KR | 10-2004-0024120 | 3/2004 |

OTHER PUBLICATIONS

Patent Abstracts of Japan for Publication No. 10-241744; dated Sep. 11, 1998 in the name of Hisashi Tsukamoto et al.
Korean Patent Abstracts, Publication No. 1020010005018 A, dated Jan. 15, 2001, in the name of Un Jin Ko.
Korean Patent Abstracts, Publication No. 1020040024120 A, dated Mar. 20, 2004, in the name of Hyeong Bok Lee.
Patent Abstracts of Japan, Publication No. 10-247503; Publication Date: Sep. 14, 1998; in the name of Tadashi Terajima et al.
Patent Abstracts of Japan, Publication No. 2001-185224; Publication Date: Jul. 6, 2001; in the name of Katsuya Shichimoto.

* cited by examiner

*Primary Examiner*—Stephen J. Kalafut
(74) *Attorney, Agent, or Firm*—Christie, Parker & Hale, LLP

(57) ABSTRACT

Lithium secondary batteries having deformation prevention straps for preventing the electrode assemblies of the lithium secondary batteries from deforming and methods for manufacturing the same are disclosed. A lithium secondary battery comprises an electrode assembly comprising a first electrode plate having a first electrode tab attached thereto, a second electrode plate having a second electrode tab attached thereto, and a separator between the first and second electrode plates. The electrode assembly is formed by winding the first and second electrode plates and the separator. A deformation prevention strap is attached to at least a portion of the electrode assembly and is wound in a direction substantially perpendicular to the direction in which the electrode assembly is wound. The electrode assembly, including the deformation prevention strap, is enclosed within a battery case. A cap assembly seals the case and comprises an electrode terminal electrically connected to the electrode assembly.

15 Claims, 14 Drawing Sheets

LITHIUM SECONDARY BATTERY AND METHOD FOR MANUFACTURING THE SAME

CROSS REFERENCE TO RELATED APPLICATION

This application claims priority to and the benefit of Korean Patent Application number 2004-0077232, filed Sep. 24, 2004 in the Korean Intellectual Property Office, the entire content of which is incorporated herein by reference.

FIELD OF THE INVENTION

The present invention relates to a lithium secondary battery and a method for manufacturing the same. More particularly, the present invention relates to a lithium secondary battery comprising means for preventing deformation of the electrode assembly and a method for manufacturing the same.

BACKGROUND OF THE INVENTION

Light, compact, electric and electronic appliances including cellular phones, laptop computers, and camcorders have recently been vigorously developed and produced. These portable electric and electronic appliances operate on battery packs when separate power supplies are unavailable. Battery packs comprise at least one battery to generate the voltage necessary to operate the appliances for a specified period of time.

Secondary batteries have recently been used for these battery packs because they can be charged and recharged, making them economical. Typical examples of secondary batteries include nickel-cadmium (Ni—Cd) batteries, nickel-hydrogen (Ni-MH) batteries, lithium (Li) batteries, and lithium ion batteries. Lithium secondary batteries are particularly attractive because they operate at 3.6 V, a voltage three times higher than that of nickel-cadmium batteries and nickel-hydrogen batteries which are widely used as power supplies for portable electronic appliances. In addition, lithium secondary batteries have high energy density per unit weight.

Lithium secondary batteries use lithium-based oxides as positive electrode active materials and carbon materials as negative electrode active materials. Lithium secondary batteries are generally classified according to the type of electrolyte used and are classified into lithium ion batteries using liquid electrolytes and lithium polymer batteries using polymer electrolytes. Lithium secondary batteries can take various shapes, including cylinders, squares, and pouches.

A lithium secondary battery generally comprises a positive electrode plate coated with a positive electrode active material, a negative electrode plate coated with a negative electrode active material, and a separator positioned between the positive and negative electrode plates. The separator serves to prevent short circuits and allows passage only to lithium ions. An electrode assembly is formed by winding the positive electrode plate, the negative electrode plate and the separator. The secondary battery also comprises a battery case for holding the wound electrode assembly. An electrolyte is injected into the lithium secondary battery case to allow movement of lithium ions.

The electrode assembly of the lithium secondary battery is formed by first applying positive and negative electrode active materials to positive and negative electrode collectors, respectively, which have metallic bases. The positive and negative electrode plates are then wound together with a separator to form the electrode assembly.

However, these wound electrode assemblies may become unwound due the elasticity of the metal electrode collectors. The elastic force of the metal causes the metal electrode collectors, and thus the electrode assemblies, to unwind. To prevent the assembly from unwinding in this fashion, winding fixation tapes wound around the outer periphery of the electrode assembly have been proposed. These winding fixation tapes are wound around the electrode assembly in the same direction as the electrode assembly itself is wound.

However, these winding fixation tapes cannot prevent swelling of the electrode assembly, which occurs upon erroneous battery operation, e.g., overcharging. Such erroneous operation causes the electrode assembly to swell during charging and generates a short circuit between the positive and negative electrode plates. Consequently, the thermal stability of the electrode assembly during charging deteriorates.

SUMMARY OF THE INVENTION

In one embodiment of the present invention, a lithium secondary battery having a deformation prevention strap is provided. In another embodiment, a method for making a lithium secondary battery having a deformation prevention strap is provided.

The lithium secondary battery generally comprises an electrode assembly comprising a first electrode plate having a first electrode tab attached thereto, a second electrode plate having a second electrode tab attached thereto, and a separator positioned between the first and second electrode plates. The electrode assembly is formed by winding the first and second electrode plates and the separator. A deformation prevention strap is attached to at least a portion of the electrode assembly. In one embodiment, the deformation prevention strap comprises a tape wound around the electrode assembly in a direction substantially perpendicular to the direction in which the electrode assembly is wound. The lithium secondary battery further comprises a case for containing the electrode assembly and a cap assembly coupled to the case to seal the case. The cap assembly comprises a terminal portion electrically connected to the electrode assembly.

In one embodiment, the deformation prevention strap extends along the outer periphery of the electrode assembly, and extends between the first and second electrode tabs. The deformation prevention strap according to this embodiment is wound around the electrode assembly in a direction substantially perpendicular to the direction in which the electrode assembly is wound.

In an alternative embodiment, the deformation prevention strap comprises a first member wound around the outer periphery of the electrode assembly in a direction substantially perpendicular to the direction in which the electrode assembly is wound. The deformation prevention strap further comprises a second member wound around the outer periphery of the electrode assembly in a direction substantially parallel to the direction in which the electrode assembly is wound.

In another embodiment, the deformation prevention strap has first and second ends and the first end is attached to the electrode assembly near the top of a first planar surface of the electrode assembly. The second end is attached near the bottom of the first planar surface of the electrode assembly, leaving a space on the first planar surface where the deformation prevention strap is not attached. The deformation prevention strap extends between the first and second electrode tabs on the top surface of the electrode assembly. The deformation prevention strap then extends along a second planar surface of the electrode assembly, and completely covers the second planar surface. The deformation prevention strap then extends across the bottom surface of the electrode assembly, and the second end of the deformation prevention strap terminates near the bottom of the first planar surface of the electrode assembly.

In yet another embodiment, the electrode assembly deformation prevention strap has first and second ends, and the first end is attached near the bottom of a first planar surface of the electrode assembly. The second end is attached near the bottom of a second planar surface of the electrode assembly. The deformation prevention strap extends from near the bottom of the first planar surface of the electrode assembly, along the first planar surface of the electrode assembly, and between the first and second electrode tabs on the top of the electrode assembly. The deformation prevention strap then extends along the second planar surface of the electrode assembly, and terminates near the bottom of the second planar surface.

In still another embodiment, the deformation prevention strap has first and second ends, and the first end is attached near the top of a first planar surface of the electrode assembly. The second end is attached near the top of a second planar surface of the electrode assembly. The deformation prevention strap extends from near the top of the first planar surface of the electrode assembly, along the first planar surface of the electrode assembly, and across the bottom of the electrode assembly. The deformation prevention strap then extends along the second planar surface of the electrode assembly and terminates near the top of the second planar surface.

In one embodiment, the deformation prevention strap comprises adhesive tape. Nonlimiting examples of suitable adhesive tapes include tapes comprising compounds selected from the group consisting of polyethylene, polypropylene, polyphenylene sulfide, and mixtures thereof.

In one embodiment, the deformation prevention strap is wide enough to span at least half the distance between the first and second electrode tabs.

In another embodiment, a method for manufacturing a lithium secondary battery comprises first forming an electrode assembly. The electrode assembly comprises a first electrode plate having a first electrode tab attached thereto, a second electrode plate having a second electrode tab attached thereto, and a separator positioned between the first and second electrode plates. The first and second electrode plates and the separator are wound to form the electrode assembly. The method further comprises attaching a deformation prevention strap to at least a portion of the electrode assembly. The deformation prevention strap is wound around an outer periphery of the electrode assembly in a direction substantially perpendicular to the direction in which the electrode assembly is wound. Finally, the electrode assembly having an attached deformation prevention strap is contained in a case.

BRIEF DESCRIPTION OF THE DRAWINGS

The above and other features and advantages of the present invention will become more apparent by reference to the following detailed description when considered in conjunction with the accompanying drawings, in which:

FIG. 2b is a front view of the electrode assembly and deformation prevention strap of the lithium secondary battery of FIG. 2a;

FIG. 3b is a front view of the electrode assembly and deformation prevention strap of the lithium secondary battery FIG. 3a;

FIG. 4b is a side view of the electrode assembly and deformation prevention strap of the lithium secondary battery of FIG. 4a;

FIG. 5b is a side view of the electrode assembly and deformation prevention strap of the lithium secondary battery of FIG. 5a;

FIG. 6b is a side view of the electrode assembly and deformation prevention strap of the lithium secondary battery of FIG. 6a;

DETAILED DESCRIPTION

Figure 1:
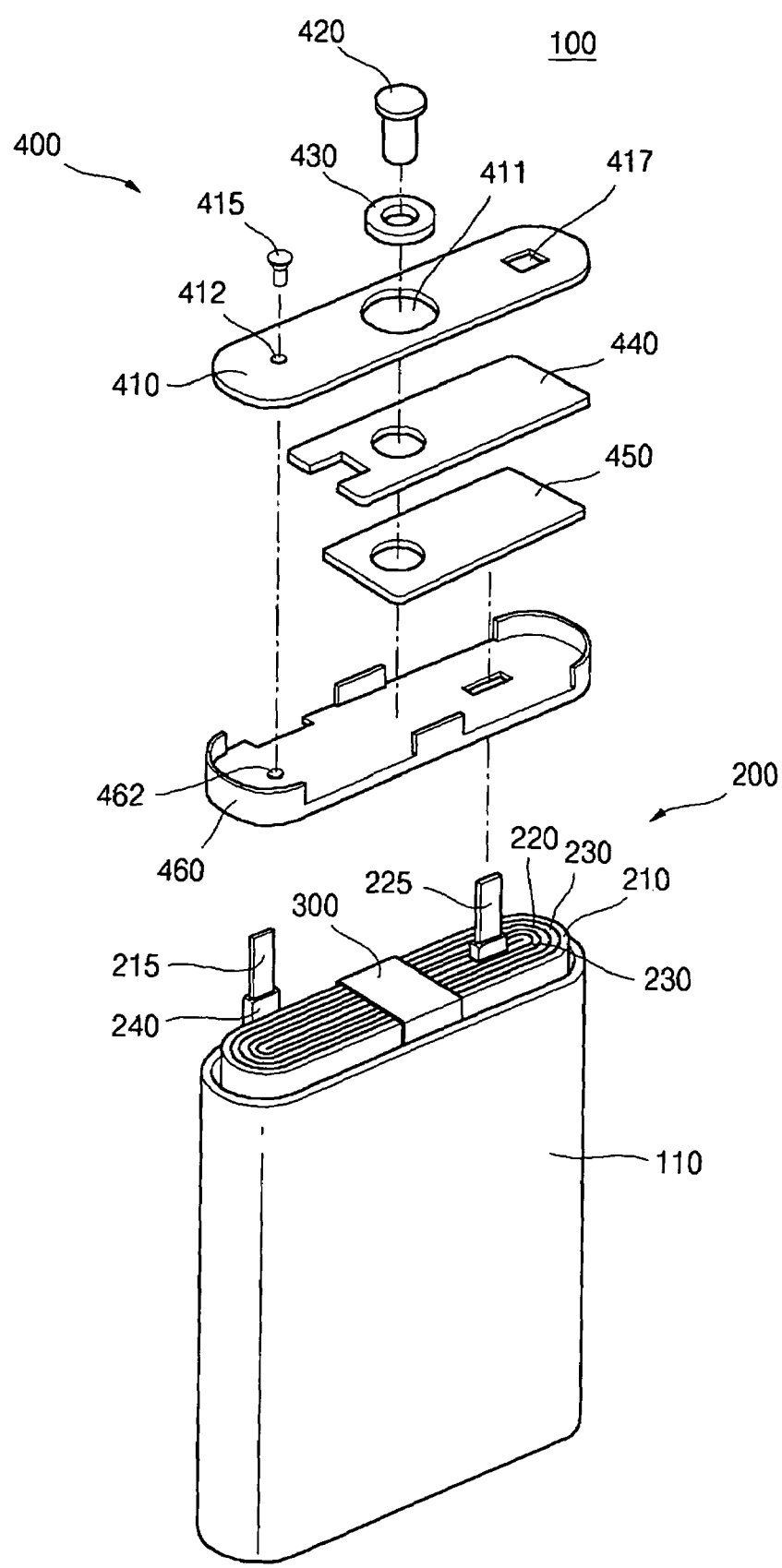
FIG. 1 is an exploded perspective view of a lithium secondary battery according to one embodiment of the present invention.

Exemplary embodiments of the present invention will now be described with reference to the accompanying drawings. In the following description and accompanying drawings, like reference numerals are used to designate like components in order to omit repetitive descriptions of same or similar components.

FIG. 1 is an exploded perspective view of a lithium secondary battery according to one embodiment of the present invention. Referring to FIG. 1, a lithium secondary battery 100 according to one embodiment of the present invention comprises a lithium secondary battery case 110, a jelly roll-type electrode assembly 200 contained in the lithium secondary battery case 110, a deformation prevention strap 300 for preventing deformation of the electrode assembly, and a cap assembly 400 coupled to the top of the lithium secondary battery case 110.

The lithium secondary battery case 110 comprises a metallic material, and takes approximately a square shape. The case itself can act as an electrode.

The electrode assembly 200 comprises a first electrode plate 210 having a first electrode tab 215 attached thereto, a second electrode plate 220 having a second electrode tab 225 attached thereto, and a separator 230 positioned between the first electrode plate 210 and second electrode plate 220. Each of the first and second electrode tabs 215 and 225, respectively, can be either a positive electrode tab or a negative electrode tab depending on whether the tab is attached to a positive electrode plate or a negative electrode plate. The first and second electrode plates 210 and 220, respectively, and the separator 230 are wound together to form an electrode assembly 200. The electrode assembly 200 is then contained in the lithium secondary battery case 110. The portions of the first and second electrode tabs 215 and 225, respectively that are attached to the electrode assembly 200 are insulated by an insulation tape 240 to avoid short circuits between the first and second electrode plates 210 and 220, respectively.

The deformation prevention strap 300 prevents the electrode assembly 200 from becoming unwound and swelling due to erroneous battery operation, e.g. overcharging. The deformation prevention strap 300 comprises an adhesive tape which may comprise a compound selected from the group consisting of polyethylene (PE), polypropylene (PP), polyphenylene sulfide (PPS), equivalents thereof and mixtures thereof.

The deformation prevention strap 300 is attached to at least a portion of the outer periphery of the electrode assembly 200. The deformation prevention strap 300 is wound around the periphery of the electrode assembly 200 in a direction substantially perpendicular to the direction in which the electrode assembly 200 is wound. In one embodiment, the deformation prevention strap 300 extends between the first and second electrode tabs 215 and 225, respectively, on the top surface of the electrode assembly.

The cap assembly 400 comprises a planar cap plate 410 sized and shaped to fit the opening of the lithium secondary battery case 110. The cap plate 410 has a terminal through-hole 411 at its center, an electrolyte injection hole 412 on one side of the through-hole 411, and a safety vent 417 on the other side of the through-hole 411. The electrolyte injection hole 414 can be sealed with a plug 415. The safety vent 417 prevents the lithium secondary battery 100 from exploding when its internal pressure rises.

An electrode terminal 420, e.g. a negative electrode terminal, is positioned such that it can be inserted into the terminal through-hole 411. A tube-shaped gasket 430 placed around the terminal through-hole 411 insulates the electrode terminal 420 from the cap plate 410. An insulation plate 440 is positioned on the bottom surface of the cap plate 410. A terminal plate 450 is positioned on the bottom surface of the insulation plate 440.

The electrode terminal 420 is inserted through the gasket 430 and through the terminal through-hole 411. The electrode terminal 420 passes through the insulation plate and is electrically connected to the terminal plate 450.

The first electrode tab 215, which is attached to the first electrode plate 210, is welded to the bottom surface of the cap plate 410. The second electrode tab 225, which is attached to the second electrode plate 220 is welded to the bottom surface of the electrode terminal 420.

An insulation case 460 is positioned on the open top surface of the electrode assembly 200 to electrically insulate the electrode assembly 200 from the cap assembly 400 and to cover the open top surface of the electrode assembly 200. The insulation case 460 has an electrolyte injection through-hole 462 positioned such that it communicates with the electrolyte injection hole 412 of the cap plate 410. The insulation case 460 comprises a high molecular weight resin having good insulative properties. One nonlimiting example of a suitable composition for the insulation case is polypropylene.

Figure 2A:
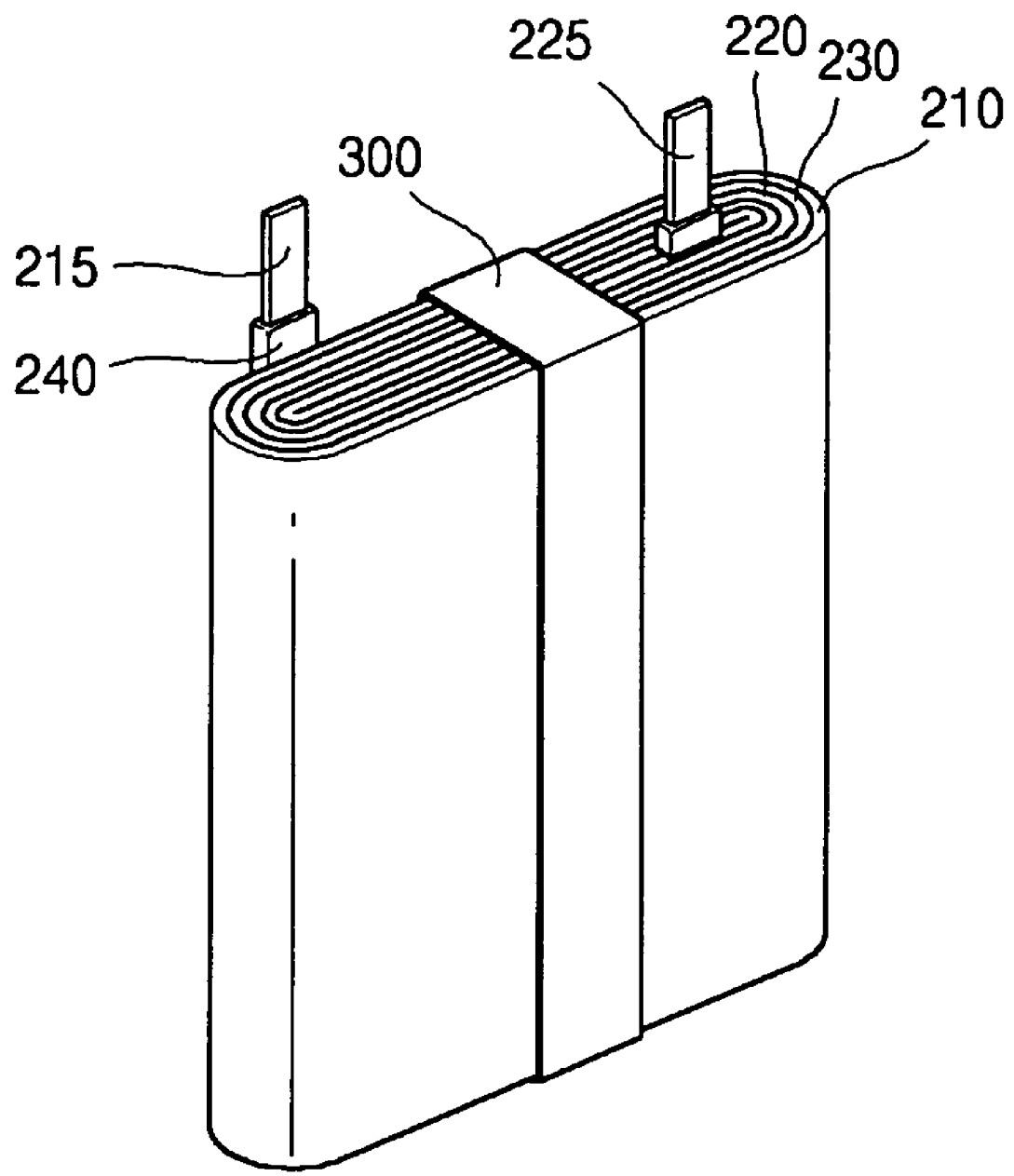
FIG. 2a is a perspective view of an electrode assembly and deformation prevention strap of a lithium secondary battery according to one embodiment of the present invention.
Figure 2B:
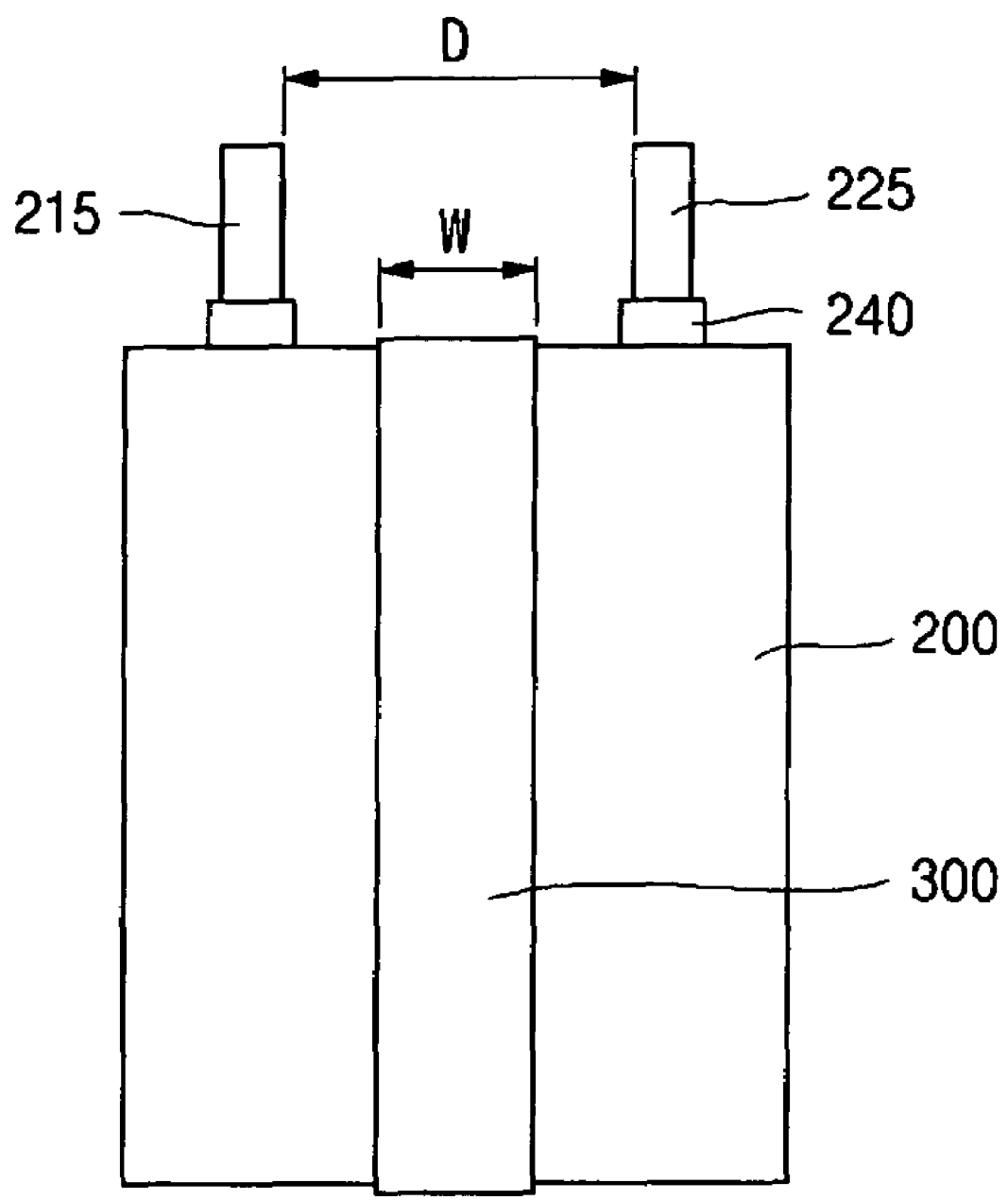

FIG. 2a is a perspective view of an electrode assembly and deformation prevention strap of a lithium secondary battery according to one embodiment of the present invention. FIG. 2b is a front view of the electrode assembly and deformation prevention strap of the lithium secondary battery of FIG. 2a. Referring to FIGS. 2a and 2a, an electrode assembly 200 of a lithium secondary battery 100 according to one embodiment of the present invention comprises a deformation prevention strap 300 extending along at least a portion of an outer periphery of the electrode assembly 200. The deformation prevention strap 300 comprises an adhesive tape having a predetermined width and extends along at least a portion of an outer periphery of the electrode assembly 200. The deformation prevention strap 300 is wound around the periphery of the electrode assembly 200 in a direction substantially perpendicular to the direction in which the electrode assembly 200 is wound. In the depicted embodiment, the deformation prevention strap 300 extends around the entire periphery of the electrode assembly 200, and extends across the top surface of the electrode assembly 200 between the first and second electrode tabs 215 and 225, respectively.

The deformation prevention strap 300 prevents the electrode assembly 200 from becoming unwound and deforming or swelling due to erroneous battery operation, e.g. overcharging. This prevents short circuits between the first and second electrode plates 210 and 220, respectively, which can result from the swelling of the electrode assembly 200.

The width, W, of the deformation prevention strap 300 is at least half the distance, D, between the first and second electrode tabs 215 and 225, respectively, of the electrode assembly 200. If the width, W, is smaller than about half the distance, D, swelling and/or deformation of the electrode assembly 200 cannot be effectively prevented.

The deformation prevention strap 300 may comprise an adhesive tape having a composition selected from the group consisting of polyethylene, polypropylene, polyphenylene sulfide, equivalents thereof and mixtures thereof.

Figure 3A:
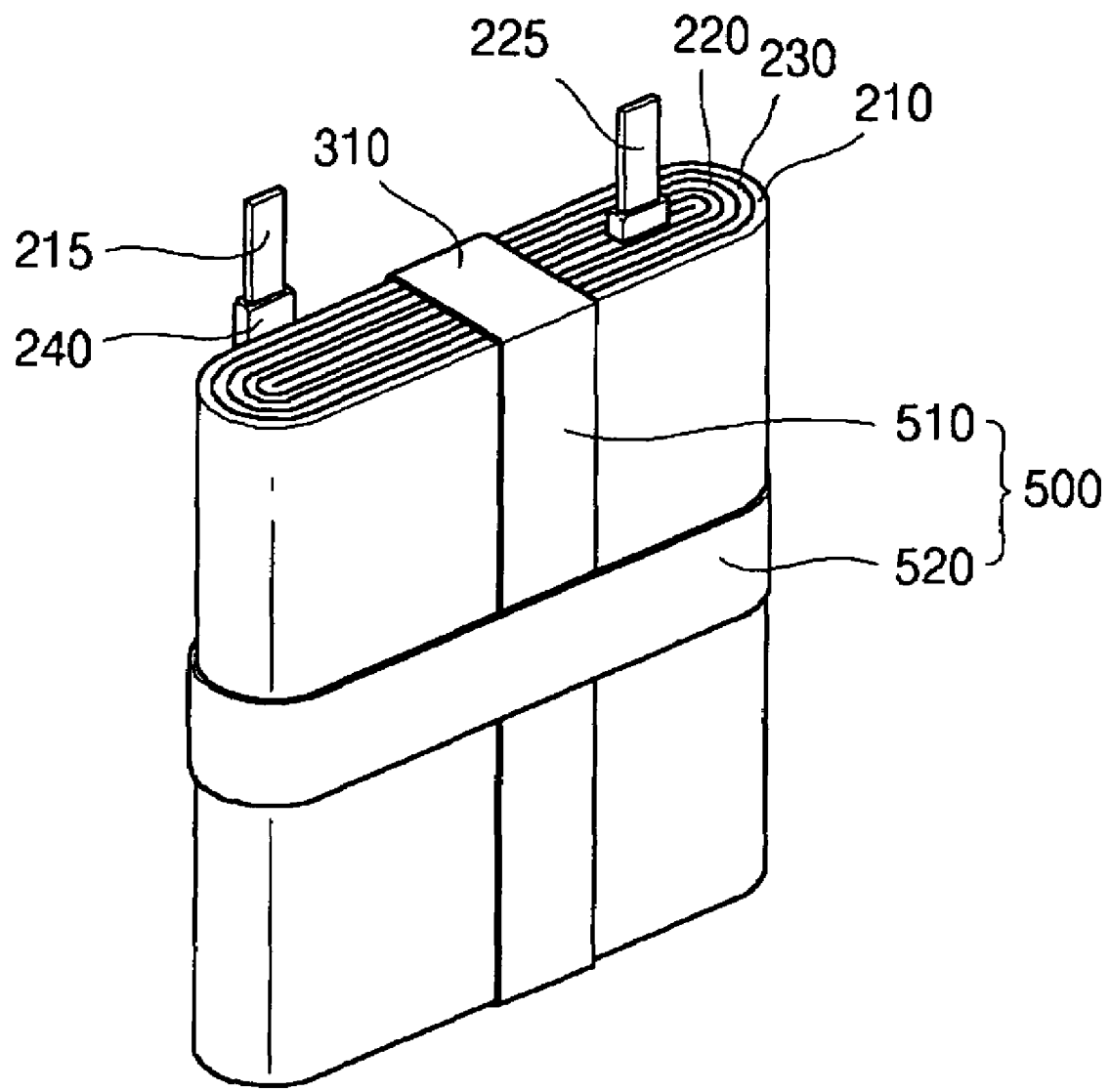
FIG. 3a is a perspective view of an electrode assembly and deformation prevention strap of a lithium secondary battery according to another embodiment of the present invention.
Figure 3B:
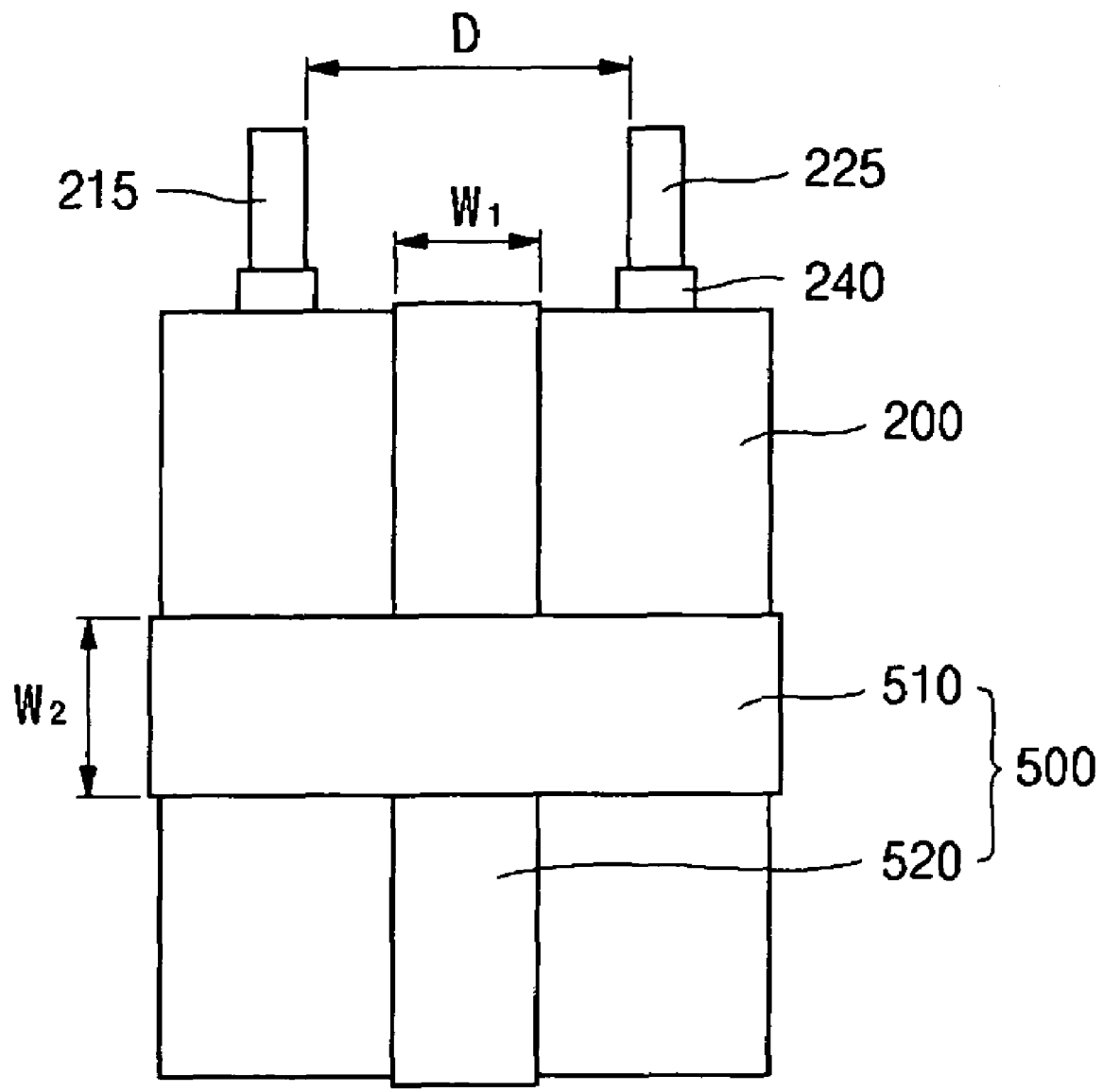

FIG. 3a is a perspective view of an electrode assembly and deformation prevention strap of a lithium secondary battery according to another embodiment of the present invention. FIG. 3b is a front view of the electrode assembly and deformation prevention strap of the lithium secondary battery of FIG. 3a. Referring to FIGS. 3a and 3b, a deformation prevention strap 500 according to another embodiment of the present invention is similar in structure to the deformation prevention strap 300 shown in FIGS. 2a and 2b. However, the deformation prevention strap 500 shown in FIGS. 3a and 3b comprises first and second deformation prevention straps 510 and 520.

The deformation prevention strap 500 comprises an adhesive tape having a predetermined width, and comprises a first deformation prevention strap 510 which extends along an outer periphery of the electrode assembly 200. The first deformation prevention strap 510 is wound around the entire outer periphery of the electrode assembly 200 in a direction substantially perpendicular to the direction in which the electrode assembly is wound. The second deformation prevention strap 520 is wound around the entire outer periphery of the electrode assembly 200 in a direction substantially parallel to the direction in which the electrode assembly 200 is wound. The first deformation prevention strap 510 may extend between the first and second electrode tabs 215 and 225, respectively, and has a width, W1, of at least half the distance, D, between the first and second electrode tabs 215 and 225, respectively. The second deformation prevention strap 520 has a width, W2, of at least a half the distance, D, between the first and second electrode tabs 215 and 225, respectively. The first and second deformation prevention straps 510 and 520, respectively, of the deformation prevention strap 500, more effectively prevent the electrode assembly 200 from deforming, e.g. swelling.

Figure 4A:
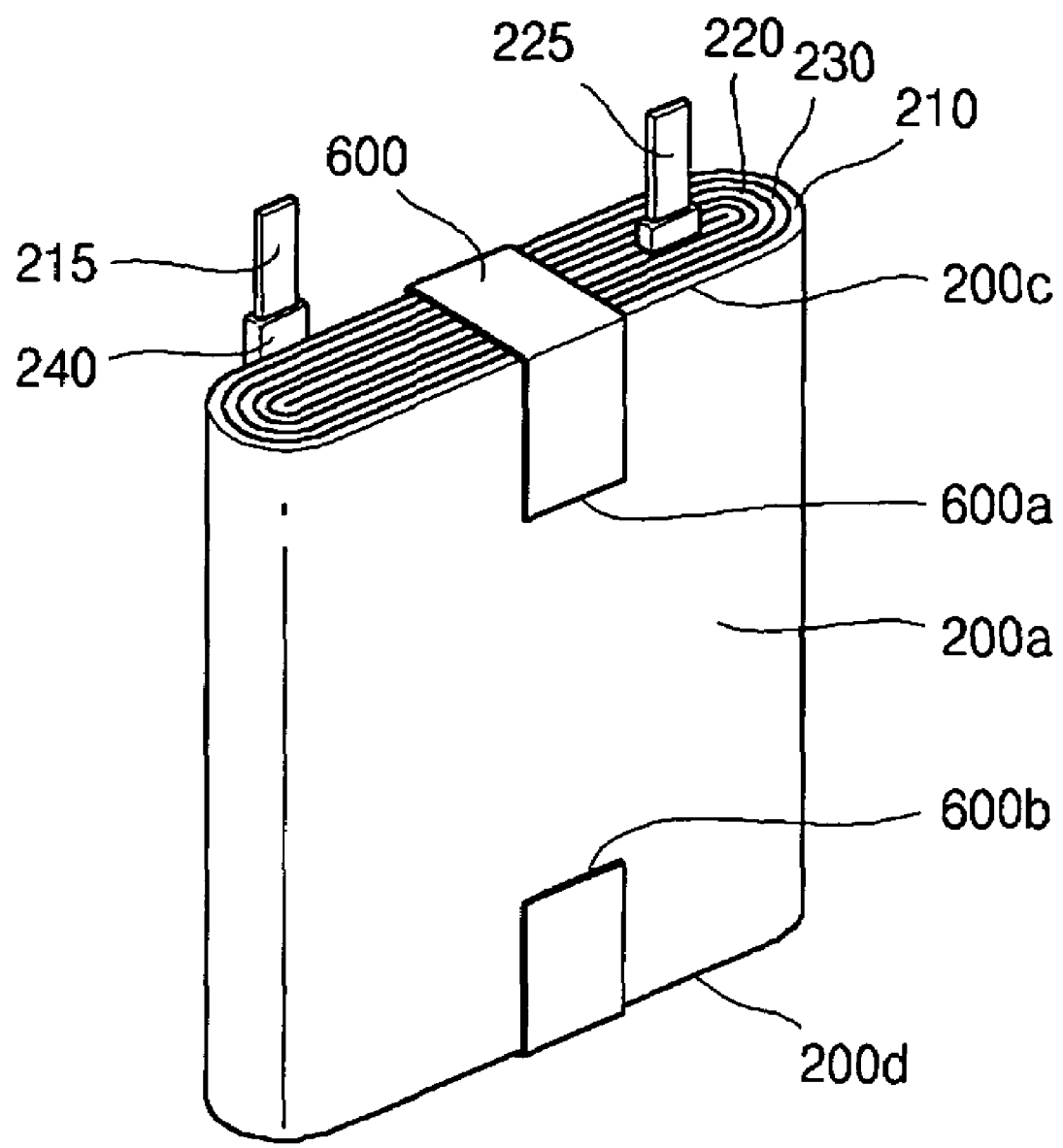
FIG. 4a is a perspective view of an electrode assembly and deformation prevention strap of a lithium secondary battery according to a third embodiment of the present invention.
Figure 4B:
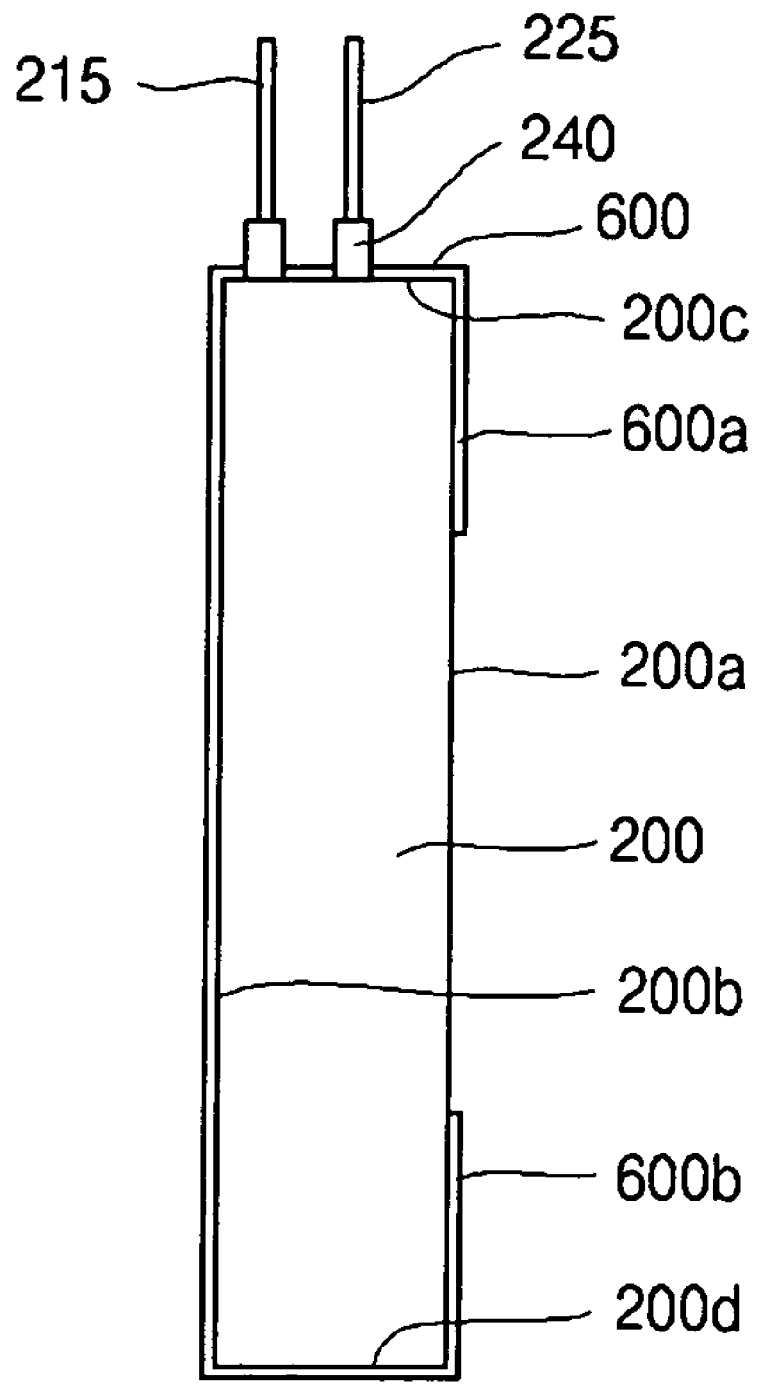

FIG. 4a is a perspective view of an electrode assembly and deformation prevention strap of a lithium secondary battery according to a third embodiment of the present invention. FIG. 4b is a side view of the electrode assembly and deformation prevention strap of the lithium secondary battery of FIG. 4a. Referring to FIGS. 4a and 4b, a deformation prevention strap 600 according to a third embodiment of the present invention is similar in structure to the deformation prevention strap 300 shown in FIGS. 2a and 2b. However, the deformation prevention strap 600 shown in FIGS. 4a and 4b does not extend along the entire periphery of the electrode assembly 200. Rather, the deformation prevention strap 600 has an approximately ⊏-shaped configuration.

More particularly, the deformation prevention strap has a first end 600a and a second end 600b, and the first end 600a is attached to the electrode assembly 200 near the top of a first planar surface 200a of the electrode assembly. The second end 600a is attached near the bottom of the first planar surface 200a of the electrode assembly, leaving a space on the first planar surface where the deformation prevention strap 600 is not attached. The deformation prevention strap 200 extends between the first and second electrode tabs 215 and 225, respectively, on the top surface 200c of the electrode assembly 200. The deformation prevention strap 600 then extends along a second planar surface 200b of the electrode assembly 200, and completely covers the second planar surface 200. The deformation prevention strap 600 then extends across the bottom surface 200d of the electrode assembly 200, and the second end 600b of the deformation prevention strap 600 terminates near the bottom of the first planar surface 200a of the electrode assembly 200. As such, the deformation prevention strap 600 has an approximately ⊏-shaped configuration when viewed from the side, as shown in FIG. 4b.

Figure 5A:
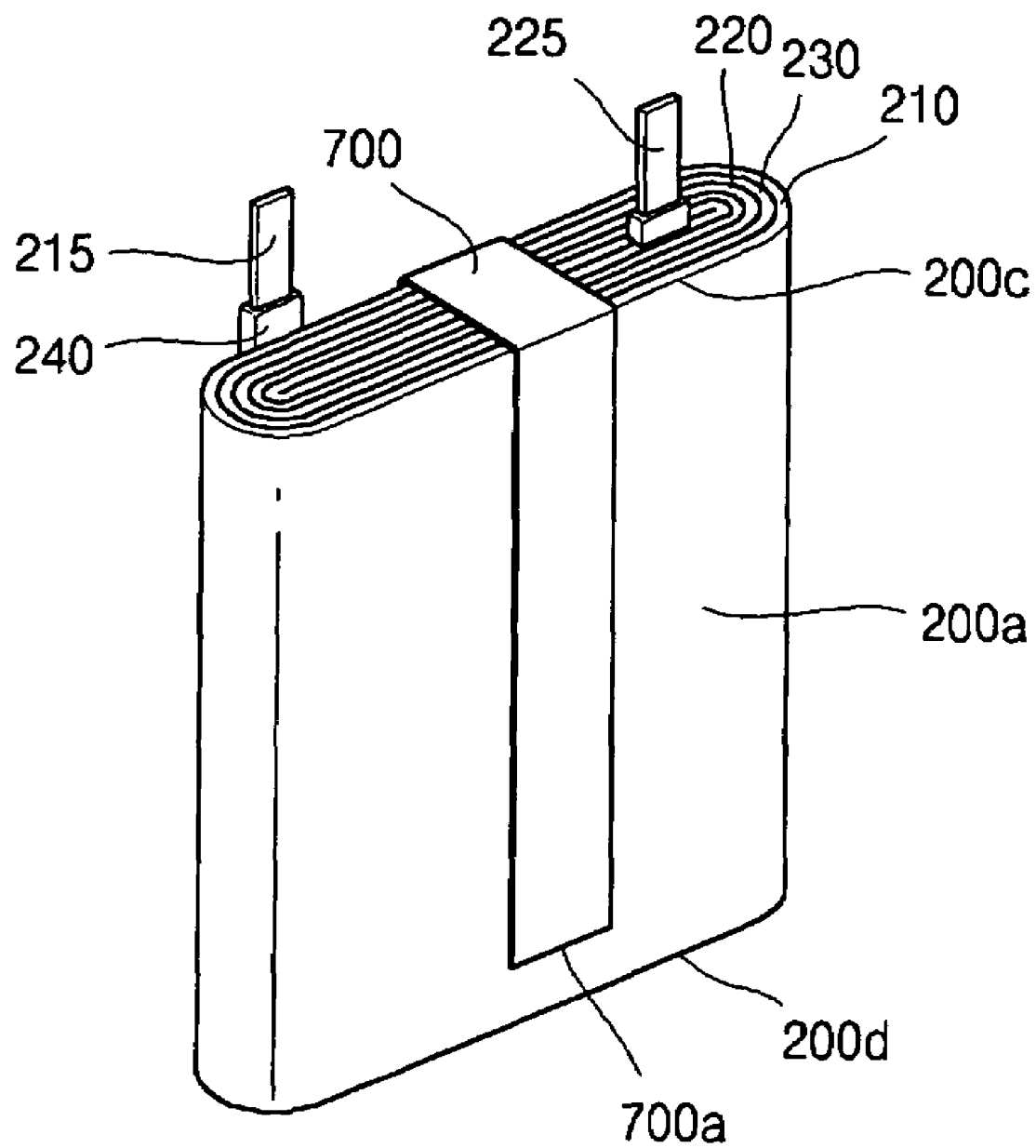
FIG. 5a is a perspective view of an electrode assembly and deformation prevention strap of a lithium secondary battery according to a fourth embodiment of the present invention.
Figure 5B:
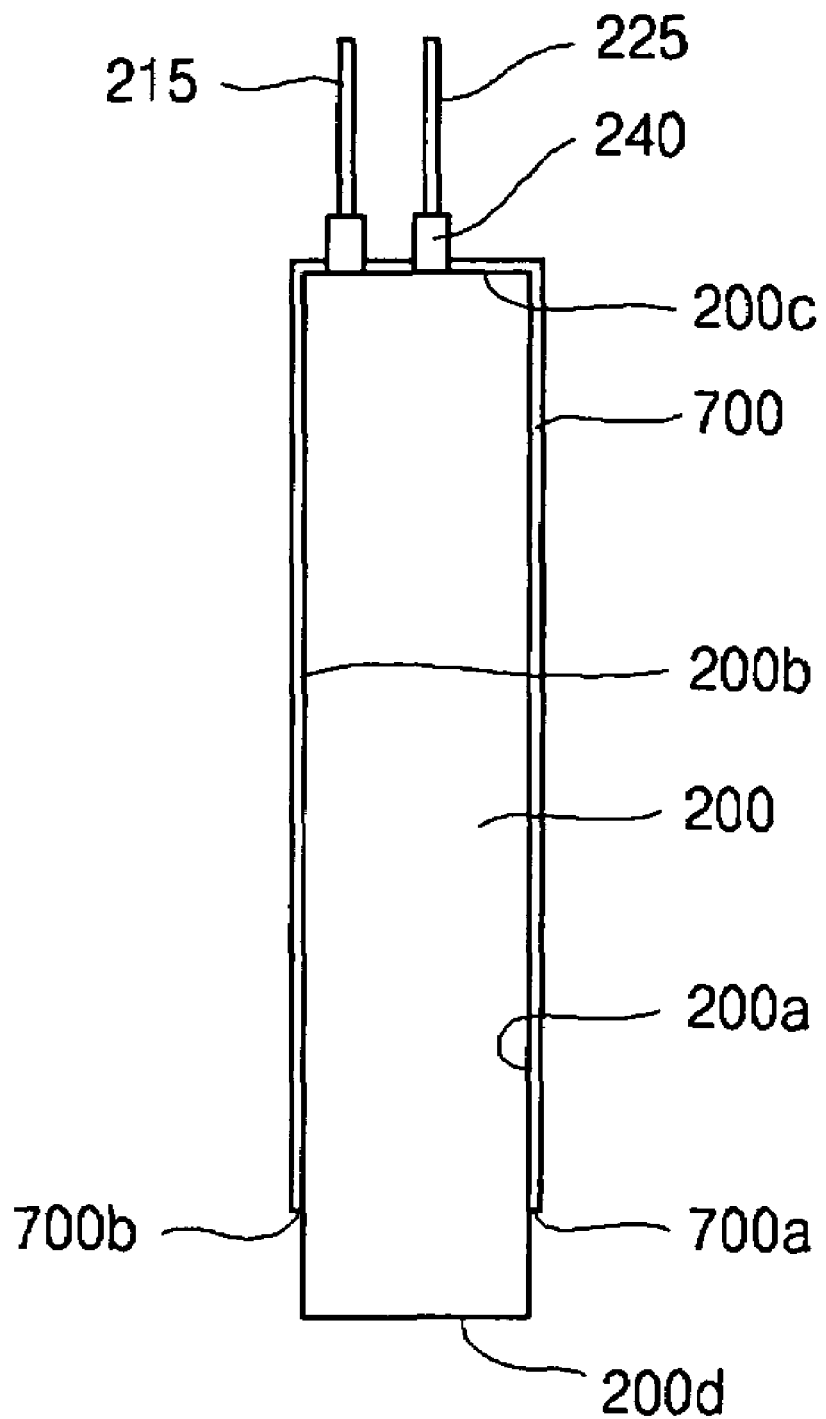

FIG. 5a is a perspective view of an electrode assembly and deformation prevention strap of a lithium secondary battery according to a fourth embodiment of the present invention. FIG. 5b is a side view of the electrode assembly and deformation prevention strap of the lithium secondary battery of FIG. 5a. Referring to FIGS. 5a and 5b, a deformation prevention strap 700 according to another embodiment of the present invention is similar in structure to the deformation prevention strap 300 shown in FIGS. 2a and 2b. However, the deformation prevention strap 700 is wound around an outer periphery of the electrode assembly 200 in an approximately ⊏-shaped configuration.

More particularly, the deformation prevention strap 700 has a first end 700a and a second end 700b, and the first end 700a is attached near the bottom of a first planar surface 200a of the electrode assembly 200. The second end 700b is attached near the bottom of a second planar surface 200b of the electrode assembly 200. The deformation prevention strap 700 extends from near the bottom of the first planar surface 200a of the electrode assembly 200, along the first planar surface 200a of the electrode assembly 200, and between the first and second electrode tabs 215 and 225, respectively, on the top surface 200c of the electrode assembly 200. The deformation prevention strap 700 then extends along the second planar surface 200b of the electrode assembly 200, and terminates near the bottom of the second planar surface 200b. As such, the deformation prevention strap 700 has an approximately n-shape configuration when viewed from the side, as shown in FIG. 5b.

Figure 6A:
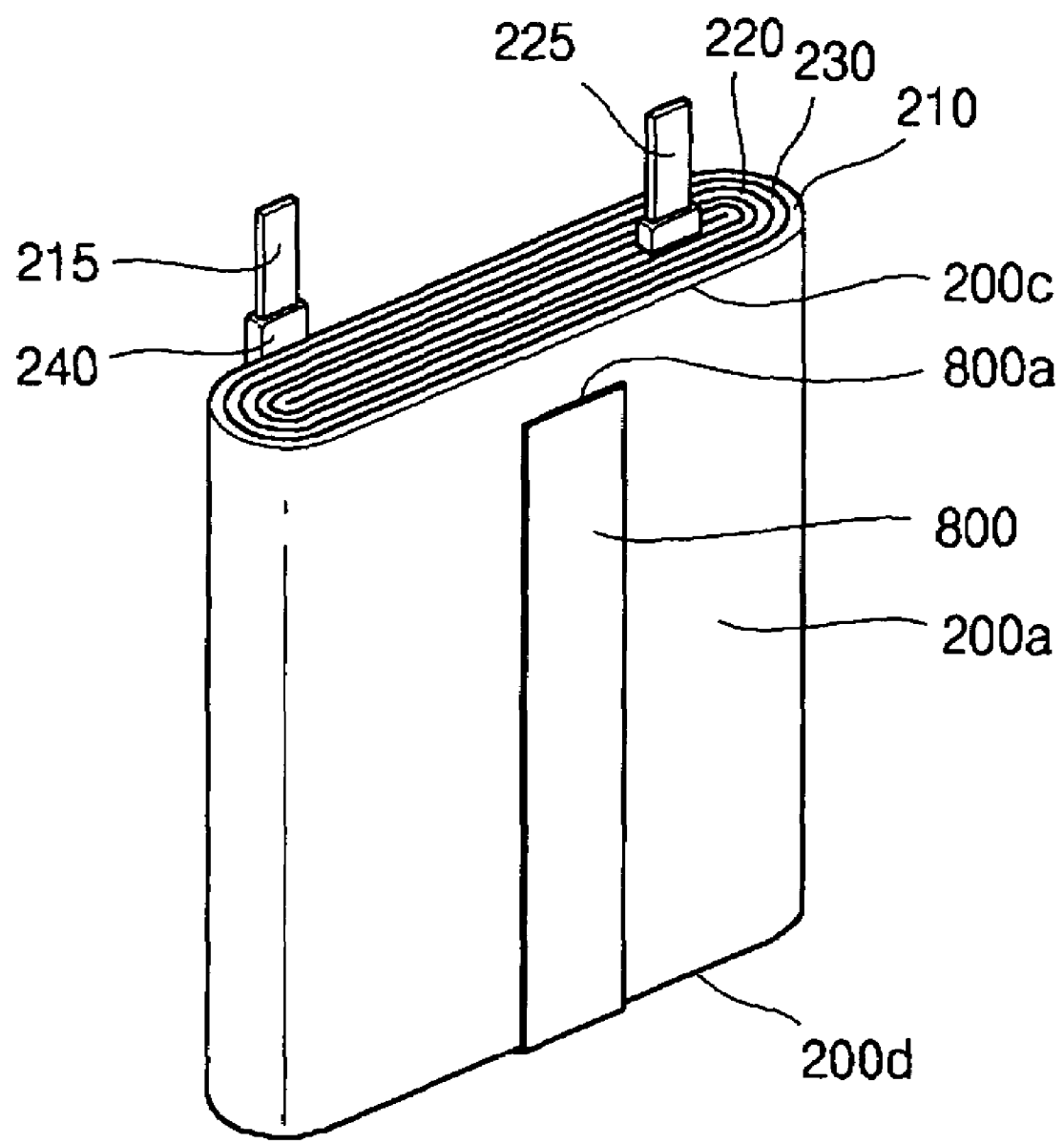
FIG. 6a is a perspective view of an electrode assembly and deformation prevention strap of a lithium secondary battery according to a fifth embodiment of the present invention.
Figure 6B:
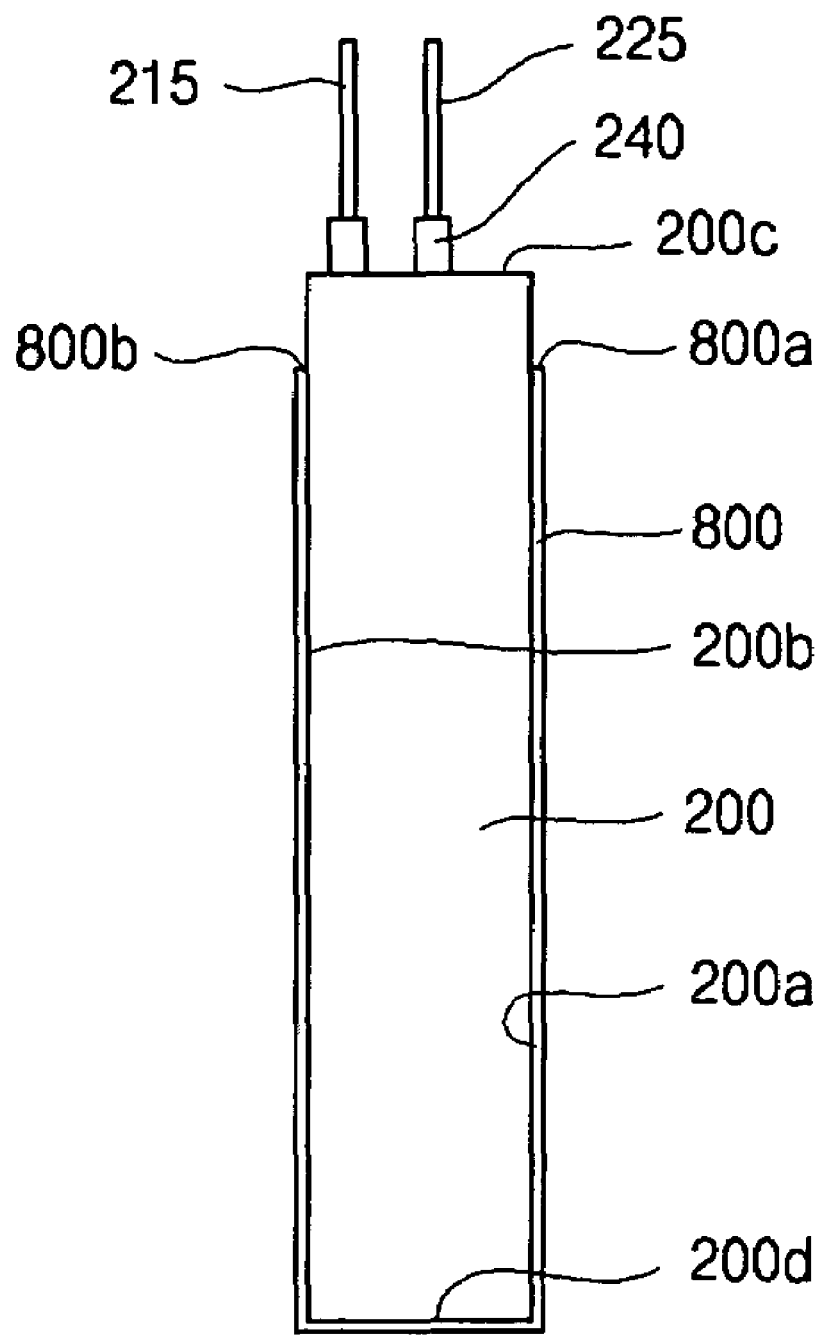

FIG. 6a is a perspective view of an electrode assembly and deformation prevention strap of a lithium secondary battery according to a fifth embodiment of the present invention. FIG. 6b is a side view of the electrode assembly and deformation prevention strap of the lithium secondary battery of FIG. 6a Referring to FIGS. 6a and 6b, a deformation prevention strap 800 according to another embodiment of the present invention is similar in structure to the deformation prevention strap 300 shown in FIGS. 2a and 2b. However, the deformation prevention strap 800 is wound around the outer periphery of the electrode assembly 200 in an approximately ⊔-shaped configuration.

More particularly, the deformation prevention strap 800 has a first end 800a and a second end 800b, and the first end 800a is attached near the top of a first planar surface 200a of the electrode assembly 200. The second end 800b is attached near the top of a second planar surface 200b of the electrode assembly 200. The deformation prevention strap 800 extends from near the top of the first planar surface 200a of the electrode assembly 200, along the first planar surface 200a of the electrode assembly 200, and across the bottom surface 200d of the electrode assembly 200. The deformation prevention strap 800 then extends along the second planar surface 200b of the electrode assembly 200 and terminates near the top of the second planar surface 200b. As such, the deformation prevention strap 800 has an approximately "⊔" shaped configuration when viewed from the side, as shown in FIG. 6b.

Figure 7A:
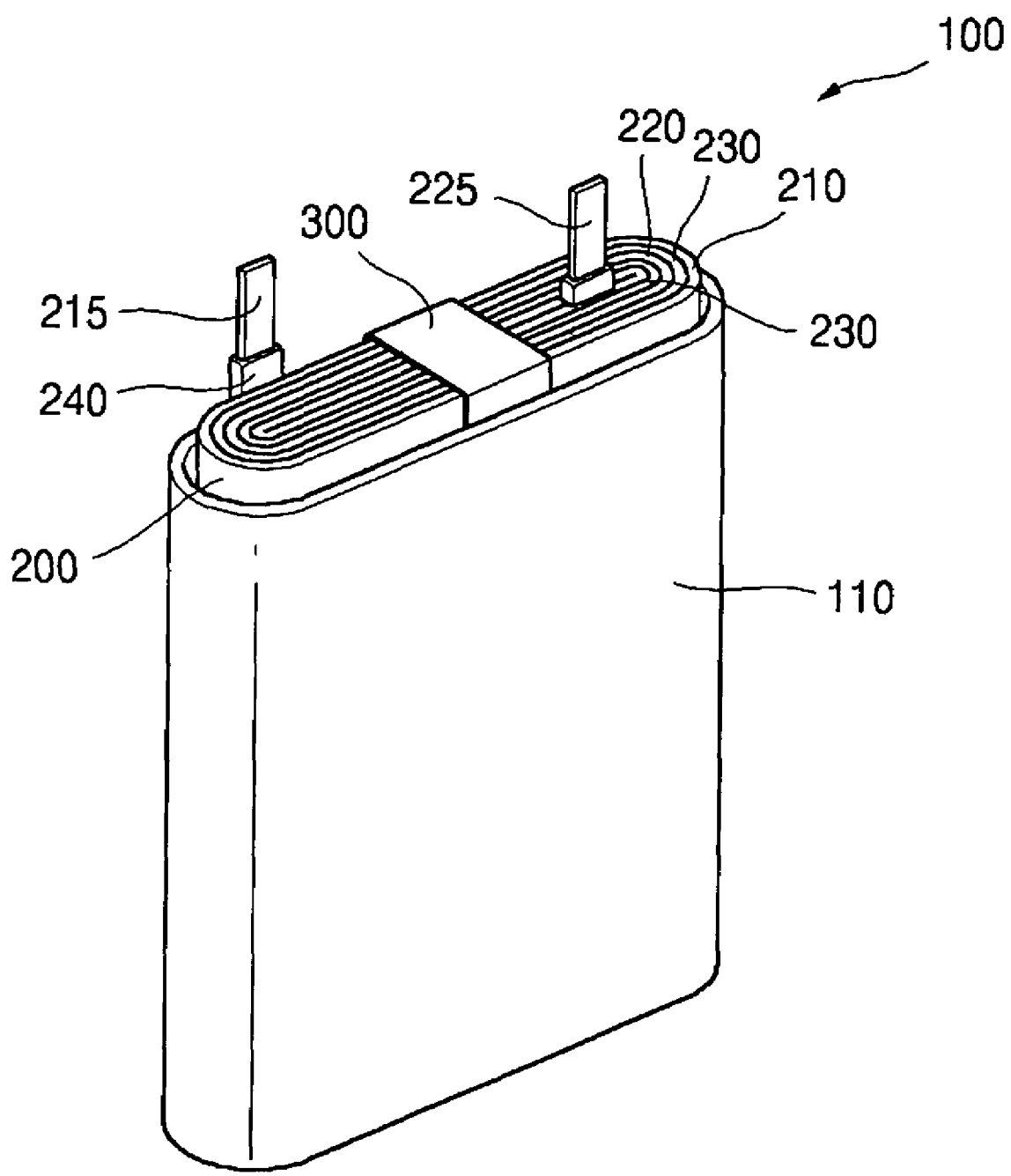
FIG. 7a is a perspective view of an electrode assembly and deformation prevention strap enclosed within an unsealed case according to one embodiment of the present invention.
Figure 7B:
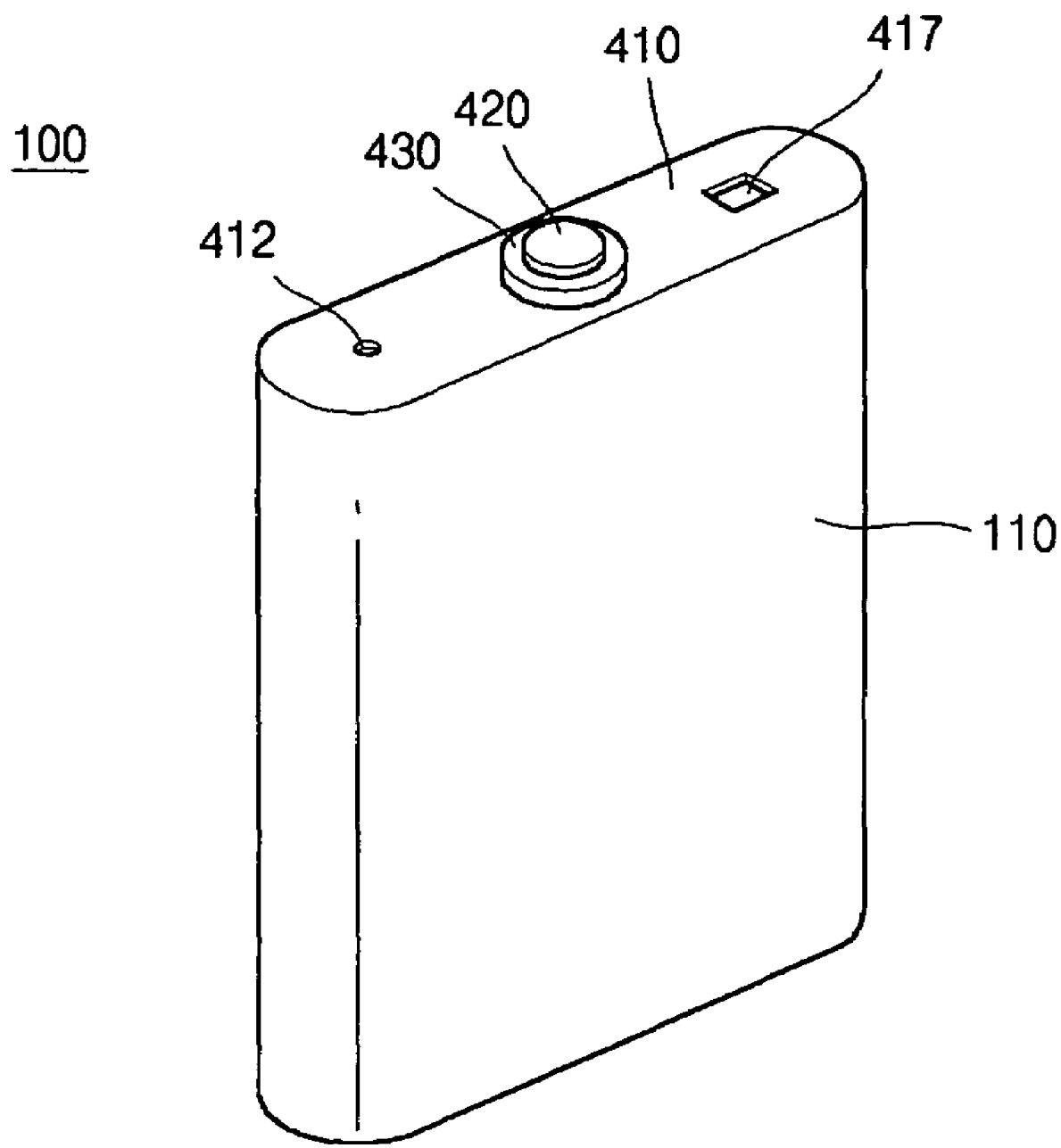
FIG. 7b is a perspective view of a lithium secondary battery having an unsealed electrolyte injection hole according to one embodiment of the present invention.
Figure 7C:
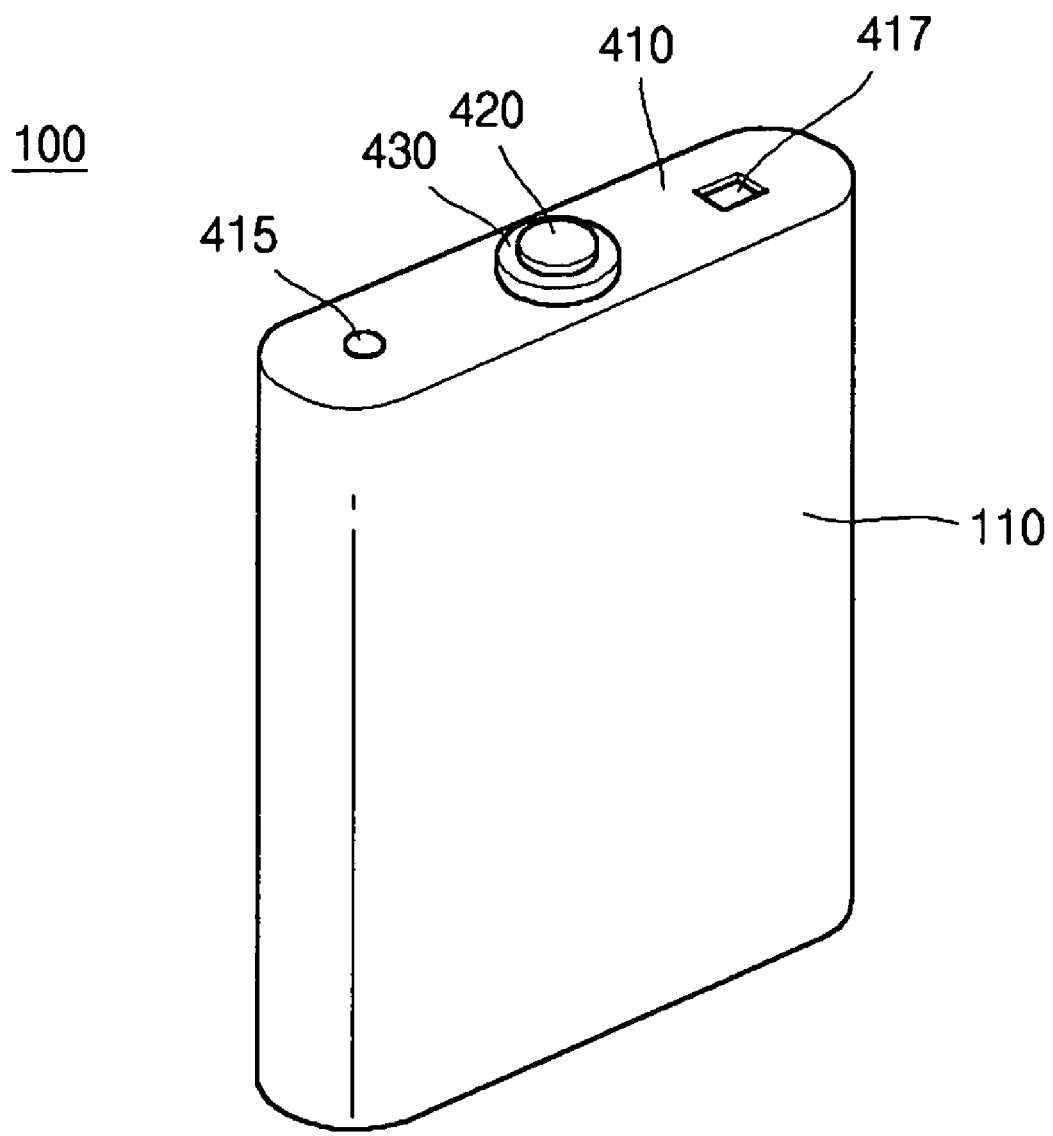
FIG. 7c is a perspective view of a lithium secondary battery having a sealed electrolyte injection hole according to one embodiment of the present invention.

FIGS. 7a to 7c depict a lithium secondary battery 100 during different stages of its manufacture according to one exemplary method. Referring to FIG. 7a, an electrode assembly 200 is formed by first successively laminating a first electrode plate 210, a separator 230, and a second electrode plate 220. A first electrode tab 215 is then attached to the first electrode plate, and the second electrode tab 225 is attached to the second electrode plate. The first electrode plate 210, the separator 230 and the second electrode plate 220 are then wound to form the electrode assembly 200.

After forming the electrode assembly 200, a deformation prevention strap according to one of the above described embodiments is attached to the electrode assembly 200. For example, the deformation prevention strap 300 may be attached as shown in FIGS. 2a and 2b. Alternatively, the deformation prevention strap 500 may be attached as shown in FIGS. 3a and 3b. In another embodiment, the deformation prevention strap 600 may be attached as shown in FIGS. 4a and 4b. In addition, the deformation member 700 may be attached as shown in FIGS. 5a and 5b. Finally, the deformation prevention strap 800 may be attached as shown in FIGS. 6a and 6b.

In certain embodiments, the deformation prevention strap 300, 500, 600, 700, or 800 comprises an adhesive tape having a composition selected from the group consisting of polyethylene, polypropylene, polyphenylene sulfide, equivalents thereof and mixtures thereof.

After attaching the deformation prevention strap 300, 500, 600, 700, or 800 to the electrode assembly 200, the electrode assembly 200 including the deformation prevention strap 300, 500, 600, 700, or 800 is inserted into a lithium secondary battery case 110, as shown in FIG. 7a.

After the electrode assembly 200 is inserted into the lithium secondary battery case 110, an insulation case 460 is positioned on top of the electrode assembly 200 to insulate the electrode assembly 200 from the cap assembly 400 and to cover the top of the electrode assembly 200, as shown in FIG. 7b.

After the insulation case 460 is positioned on top of the electrode assembly 200, a cap assembly 400 is coupled to the top of the lithium secondary battery case 110. The cap assembly 400 comprises a cap plate 410 having a terminal through-hole 411, an electrolyte injection hole 412, and a safety vent 417. The cap assembly 400 further comprises an electrode terminal 420, which is inserted in the terminal through-hole 411 and is insulated from the cap plate 410 by a gasket 430.

An insulation plate 440 is positioned on the bottom surface of the cap plate 410, and a terminal plate 450 is positioned on the bottom surface of the insulation plate 440. The terminal plate 450 is electrically connected to the electrode terminal 420.

The first electrode tab 215 of the electrode assembly 200 is then bonded to the cap plate 410, electrically connecting the first electrode tab 215 to the cap plate 410. The second electrode tab 225 is bonded to the terminal plate 450, electrically connecting it to the electrode terminal 420.

The cap plate 410 of the cap assembly 400 is then coupled to the top of the lithium secondary battery case 110 by any suitable method, such as laser welding.

After the cap assembly 400 is coupled to the top of the lithium secondary battery case 110, an electrolyte is injected through the electrolyte injection hole 412. The electrolyte injection hole 412 is then sealed with a plug 415 to form a lithium secondary battery 100, as shown in FIG. 7c.

As discussed above, the inventive lithium secondary battery 100 comprises a deformation prevention strap 300, 500, 600, 700, or 800 wound around an outer periphery of the electrode assembly 100 to prevent the electrode assembly 200 from becoming unwound and deforming due to swelling during charging. The deformation prevention strap 300, 500, 600, 700 or 800 prevents short circuits from occurring between the first and second electrode plates 210 and 220. Consequently, the deformation prevention strap 300, 500, 600, 700, or 800 improves the safety of the lithium secondary battery 100.

Exemplary embodiments of the present invention have been described for illustrative purposes. However, those skilled in the art will appreciate that various modifications, additions and substitutions can be made without departing from the scope and spirit of the invention as disclosed in the accompanying claims.

What is claimed is:

1. A lithium secondary battery comprising:
a wound electrode assembly comprising:
a first electrode plate,
a first electrode tab attached to the first electrode plate,
a second electrode plate,
a second electrode tab attached to the second electrode plate,
a separator positioned between the first and second electrode plates; and
a deformation prevention strap having first and second ends attached to a portion of the electrode assembly, wherein the deformation prevention strap is wound around the electrode assembly in a direction substantially perpendicular to the direction in which the electrode assembly is wound, and wherein the first end of the deformation strap is spaced apart from the second end of the deformation prevention strap;
a battery case for containing the electrode assembly; and
a cap assembly for sealing the battery case.

2. The lithium secondary battery as claimed in claim 1, wherein the cap assembly comprises a terminal electrically connected to the electrode assembly.

3. The lithium secondary battery as claimed in claim 1, wherein the deformation prevention strap extends across a top surface of the electrode assembly.

4. The lithium secondary battery as claimed in claim 3, wherein the deformation prevention strap comprises:
a first deformation prevention strap wound around a portion of an outer periphery of the electrode assembly in a direction substantially perpendicular to the direction in which the electrode assembly is wound; and
a second deformation prevention strap wound around a portion of another outer periphery of the electrode assembly in a direction substantially parallel to the direction in which the electrode assembly is wound.

5. The lithium secondary battery as claimed in claim 1, wherein the first end and the second end of the deformation prevention strap are attached to a first planar surface of the electrode assembly, the deformation prevention strap extending across a top surface of the electrode assembly, the deformation prevention strap further extending along a second planar surface of the electrode assembly and across a bottom surface of the electrode assembly, and wherein the first end of the deformation prevention strap is spaced apart from the second end of the deformation prevention strap on the first planar surface of the electrode assembly.

6. The lithium secondary battery as claimed in claim 1, wherein the first end of the deformation prevention strap is attached to a first planar surface of the electrode assembly and the second end of the deformation prevention strap is attached to a second planar surface of the electrode assembly, the deformation prevention strap extending from the first planar surface of the electrode assembly, across a top surface of the electrode assembly, and along the second planar surface of the electrode assembly.

7. The lithium secondary battery as claimed in claim 1, wherein the first end of the deformation prevention strap is attached to a first planar surface of the electrode assembly and the second end of the deformation prevention strap is attached to a second planar surface of the electrode assembly, the deformation prevention strap extending from the first planar surface, across a bottom surface of the electrode assembly, and along the second planar surface of the electrode assembly.

8. The lithium secondary battery as claimed in claim 1, wherein the deformation prevention strap comprises an adhesive tape.

9. The lithium secondary battery as claimed in claim 8, wherein the first and second electrode tabs are separated from each other by a distance, and the deformation prevention strap has a width of at least half the distance between the first and second electrode tabs.

10. The lithium secondary battery as claimed in claim 8, wherein the adhesive tape has a composition selected from the group consisting of polyethylene, polypropylene, polyphenylene sulfide and mixtures thereof.

11. A lithium secondary battery comprising:
a wound electrode assembly having first and second surfaces and comprising:
a first electrode plate,
a first electrode tab attached to the first electrode plate,
a second electrode plate,
a second electrode tab attached to the second electrode plate,
a separator positioned between the first and second electrode plates; and
a deformation prevention strap having first and second ends attached to at least one of a top surface and a bottom surface of the electrode assembly, wherein the deformation prevention strap is wound around at least one of the top and bottom surfaces of the electrode assembly, wherein the first end of the deformation prevention strap is spaced apart from the second end of the deformation prevention strap;
a battery case for containing the electrode assembly; and
a cap assembly for sealing the battery case.

12. A method for manufacturing a lithium secondary battery, the method comprising:

winding an electrode assembly comprising:
- a first electrode plate,
- a first electrode tab attached to the first electrode plate,
- a second electrode plate,
- a second electrode tab attached to the second electrode plate, and
- a separator positioned between the first and second electrode plates;

attaching a deformation prevention strap having first and second ends to a portion of the electrode assembly, wherein the deformation prevention strap is wound around a portion of the electrode assembly in a direction substantially perpendicular to the direction in which the electrode assembly is wound, wherein the first end of the deformation prevention strap is spaced apart from the second end of the deformation prevention strap; and containing the electrode assembly in a battery case.

13. The method as claimed in claim 12, wherein the step of attaching a deformation prevention strap comprises:
- attaching a first end of the deformation prevention strap to a first planar surface of the electrode assembly;
- winding the deformation prevention strap across a top surface of the electrode assembly;
- winding the deformation prevention strap along a second planar surface of the electrode assembly;
- winding the deformation prevention strap across a bottom surface of the electrode assembly; and
- attaching a second end of the deformation prevention strap to the first planar surface of the electrode assembly, wherein the deformation prevention strap is wound around the electrode assembly in a direction substantially perpendicular to the direction in which the electrode assembly is wound, and wherein the first end of the deformation prevention strap is spaced apart from the second end of the deformation prevention strap.

14. The method as claimed in claim 12, wherein the step of attaching a deformation prevention strap comprises:
- attaching a first end of the deformation prevention strap to a first planar surface of the electrode assembly;
- winding the deformation prevention strap along the first planar surface of the electrode assembly;
- winding the deformation prevention strap across a top surface of the electrode assembly;
- winding the deformation prevention strap along a second planar surface of the electrode assembly; and
- attaching a second end of the deformation prevention strap to the second planar surface of the electrode assembly, wherein the deformation prevention strap is wound around the electrode assembly in a direction substantially perpendicular to the direction in which the electrode assembly is wound.

15. The method as claimed in claim 12, wherein the step of attaching a deformation prevention strap comprises:
- attaching a first end of the deformation prevention strap to a first planar surface of the electrode assembly;
- winding the deformation prevention strap along the first planar surface of the electrode assembly;
- winding the deformation prevention strap across a bottom surface of the electrode assembly;
- winding the deformation prevention strap along a second planar surface of the electrode assembly; and
- attaching a second end of the deformation prevention strap to the second planar surface of the electrode assembly, wherein the deformation prevention strap is wound around the electrode assembly in a direction substantially perpendicular to the direction in which the electrode assembly is wound.

* * * * *

UNITED STATES PATENT AND TRADEMARK OFFICE
CERTIFICATE OF CORRECTION

PATENT NO. : 7,618,737 B2  Page 1 of 1
APPLICATION NO. : 11/234833
DATED : November 17, 2009
INVENTOR(S) : Jin Uk Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1089 days.

Signed and Sealed this

Twenty-sixth Day of October, 2010

David J. Kappos
*Director of the United States Patent and Trademark Office*